(12) United States Patent
Alfrey

(10) Patent No.: US 7,024,864 B2
(45) Date of Patent: Apr. 11, 2006

(54) BIPOLAR CURRENT SOURCE BASED ON A UNIPOLAR POWER SUPPLY

(76) Inventor: Anthony J. Alfrey, 100 Redwood Ter., Woodside, CA (US) 94062

( * ) Notice: Subject to any disclaimer, the term of this patent is extended or adjusted under 35 U.S.C. 154(b) by 199 days.

(21) Appl. No.: 10/308,378

(22) Filed: Dec. 3, 2002

(65) Prior Publication Data

US 2003/0103364 A1    Jun. 5, 2003

Related U.S. Application Data

(60) Provisional application No. 60/338,778, filed on Dec. 5, 2001.

(51) Int. Cl.
| F25B 21/02 | (2006.01) |
| H03F 3/45 | (2006.01) |
| H03F 3/26 | (2006.01) |
| H01S 3/13 | (2006.01) |
| H01S 3/04 | (2006.01) |

(52) U.S. Cl. ............................. 62/3.7; 62/3.2; 330/255; 330/146; 372/29.014; 372/22; 372/31; 372/34; 372/36; 372/38.03

(58) Field of Classification Search ............ 62/3.1–3.7; 330/255, 146; 372/29.014, 22, 31, 34, 36, 372/38.03

See application file for complete search history.

(56) References Cited

U.S. PATENT DOCUMENTS

| 4,812,733 | A | * | 3/1989 | Tobey ........................ 323/285 |
| 5,450,727 | A | * | 9/1995 | Ramirez et al. ............... 62/3.7 |
| 5,689,957 | A | * | 11/1997 | DeVilbiss et al. ............ 62/3.7 |
| 5,689,958 | A | * | 11/1997 | Gaddis et al. ................ 62/3.7 |
| 5,936,987 | A |   | 8/1999 | Ohishi et al. |
| 6,023,193 | A |   | 2/2000 | Ierymenko |
| 6,205,790 | B1 | * | 3/2001 | Denkin et al. ................ 62/3.7 |
| 6,327,287 | B1 | * | 12/2001 | Kner et al. .................... 372/43 |
| 6,331,794 | B1 | * | 12/2001 | Blanchard .................... 327/112 |
| 6,445,530 | B1 | * | 9/2002 | Baker ....................... 360/78.04 |
| 2001/0002100 | A1 | * | 5/2001 | Compton et al. |

* cited by examiner

*Primary Examiner*—Cheryl Tyler
*Assistant Examiner*—Filip Zec

(57) ABSTRACT

An adjustable bipolar current source for a load, such as a thermoelectric cooler, includes a voltage-controlled power supply having a unipolar output, and an H-bridge. At least one of the two active elements on a first side and at least one of the two active elements on a second side of the H-bridge comprises an active conductive element responsive to a control signal to set a magnitude of current flow through the active conductive element. Control logic provides the control signals to the active elements on the first and second sides to set the polarity of the current to the load. Logic coupled to the voltage-controlled power supply maintains a supply voltage sufficient to maintain a voltage drop across the active conductive elements within a linear range of operation of the conductive elements. The output of the voltage-controlled power supply is clamped at or near a minimum stable level.

10 Claims, 8 Drawing Sheets

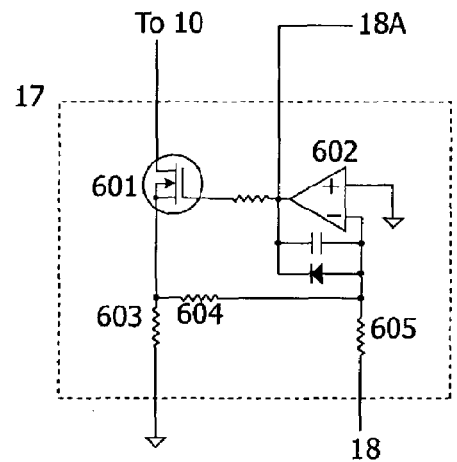
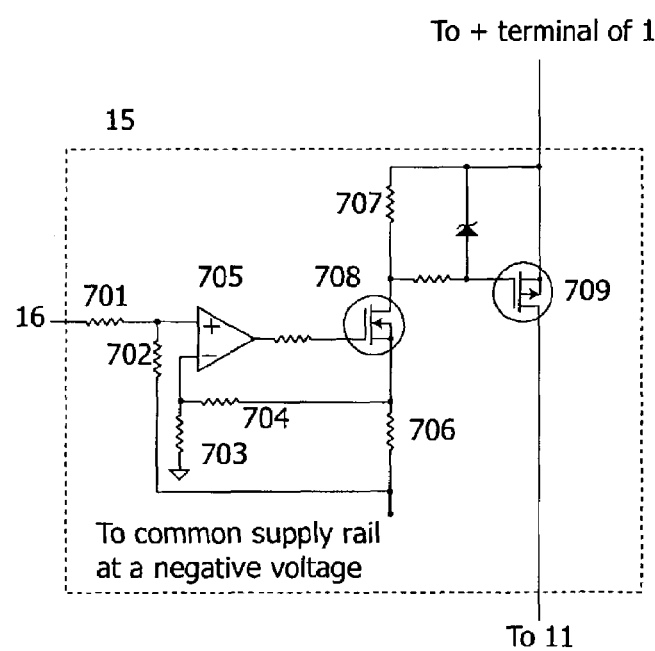
Figure 7A
Figure 7B

US 7,024,864 B2

BIPOLAR CURRENT SOURCE BASED ON A UNIPOLAR POWER SUPPLY

REFERENCE TO RELATED APPLICATION

The benefit of U.S. Provisional Patent Application No. 60/338,778, entitled METHOD FOR PROVIDING AN EFFICIENT BIPOLAR CURRENT SOURCE FROM A UNIPOLAR POWER SUPPLY, invented by Anthony J. Alfrey, and filed on 5 Dec. 2001, is hereby claimed.

BACKGROUND OF THE INVENTION

1. Field of the Invention

The present invention relates to controllable current source circuitry, and more particularly to controllable bipolar current sources operable to apply bipolar current across a load, such as a thermoelectric cooler, with a unipolar power supply.

2. Description of Related Art

Thermoelectric coolers (TEC) are solid state heat pumps used for a variety of cooling and heating applications, including heat removal and temperature control of thermal loads including laser diodes and laser crystals. The amount of heat transferred is adjusted by controlling the current through the TEC; cooling or heating functions are controlled by changing the direction of current flow through the TEC, so bipolar application of the current is required. As the operating power of said thermal loads rises, thermoelectric cooler assemblies used for these temperature control tasks may require several hundred watts of electrical power, with applied voltages of several tens of volts and currents of tens of amperes.

A bipolar current supply for driving a TEC may be assembled from an adjustable single-ended or unipolar source by adding electronically-controlled switches or conductive elements 5, 6, 7, and 8 in an H-bridge configuration shown in FIG. 1a. The magnitude of the voltage applied to the load 4 (or current passing through the load 4) is controlled by an input voltage $V_{supply\ control}$ 3 provided to the controlled power supply 1, while the polarity of the voltage applied to the load 4 is controlled by the sign of the input voltage $V_{supply\ control}$ 3 through the use of Control Logic 2. For example, if the input voltage $V_{supply\ control}$ 3 is positive with respect to ground, switches 6 and 7 are closed, making terminal 11 positive with respect to terminal 10. This circuit consisting of switches 5, 6, 7 and 8 and load 4 may be referred to as a "digital H-bridge" because the conductive elements 5, 6, 7 and 8 are either fully open or fully closed.

The action of the circuit in FIG. 1a may be graphically described in FIG. 1b, wherein the load current through 4 is plotted versus the voltage $V_{supply\ control}$ 3. For positive values of $V_{supply\ control}$, switches 6 and 7 are closed and terminal 11 is positive with respect to terminal 10, while for negative values of $V_{supply\ control}$, switches 5 and 8 are closed and terminal 10 is positive with respect to terminal 11. When the load 4 is a thermoelectric cooler, the polarity of terminal 11 with respect to the polarity of terminal 10 determines whether the thermoelectric cooler is used for heating or cooling. An example of this type of circuit utilized for the case in which the load 4 is a thermoelectric cooler is described in U.S. Pat. No. 5,936,987.

For the voltage-controlled power supply 1, it is highly desirable to utilize compact, pre-packaged, inexpensive and powerful switching power supplies which are available from commercial vendors. However, due to limitations in the design of said switching power supplies, they are often not adjustable over a full range of voltage output from zero to some maximum voltage, and may exhibit instabilities, or may not function at all when used below some particular minimum voltage $V_{minimum}$.

Referring to FIG. 2, an alternative to the above embodiment is to replace the voltage-controlled power supply 1 in FIG. 1 with a fixed-voltage supply 12, and replace switches 5, 6, 7 and 8 with voltage-controlled conductive elements 13, 15, 17 and 19 in which the current flow through said conductive elements depends linearly on a controlling voltage applied to terminals 14, 16, 18 and 20 of said conductive elements, said controlling voltage derived through the action of linear control circuitry 21 which is in turn further derived from an additional voltage $V_{control}$ 22. The conductive elements are activated in pairs diagonally across the H-bridge. By activating elements 15/17 as a pair, terminal 11 is made positive with respect to terminal 10. By activating elements 13/19 as a pair, terminal 10 is made positive with respect to terminal 11. One element out of each pair 15/17 or 13/19 may be a switch-like digital element that is either fully conducting or fully open. The circuitry of FIG. 2 (not including the fixed-voltage supply) may be referred to as a "linear H-bridge". An example of such a linear bridge is described in the prior art of U.S. Pat. No. 6,023,193.

This circuit has the disadvantage of being inefficient, which is of special importance in very high current applications. For example, in the worst-case condition for which the voltage drop across the load 4 is one-half of the fixed supply voltage $V_{supply}$ 9, the power dissipated in the linear element is equal to that delivered to the load 4 and the circuit thereby provides an overall "line-plug" efficiency of no greater than 50%. This forces the use of high-power-dissipation devices for the controlled conductive elements and also necessitates the use of large heat sinking and cooling fan assemblies, increasing both the physical size and cost of the unit.

SUMMARY OF THE INVENTION

It is therefore an objective of the invention to allow the use of inexpensive pre-packaged adjustable-voltage unipolar power supplies, said supplies possibly not providing a full range of output voltages, comprised within a circuit that provides adjustable bipolar output current.

It is another objective of the invention to minimize the power dissipated in the linear elements of an H-bridge while simultaneously maximizing the transfer of power to a load.

It is yet another objective of the subject invention to apply H-bridge circuitry to the application of power to a thermoelectric cooler for the purpose of controlling the temperature of a thermal load.

The present invention provides an inexpensive, compact, programmable, high-current and bipolar current source as a power source for thermoelectric coolers, or any other load requiring a bipolar current source.

Embodiments of the present invention comprise an apparatus for applying an adjustable bipolar current to a load, such as a thermoelectric cooler. The apparatus includes a voltage-controlled power supply having a unipolar output. An H-bridge has a first side with two active elements connected at a first node in series between the unipolar output of the power supply and ground, and a second side with two active elements connected at a second node in series between the unipolar output of the power supply and ground. The first and second nodes are adapted to be coupled to the load so that current may flow between the first and second nodes through the load, the magnitude and polarity of said current flow through the load resulting from the response of said active elements to control signals. Control logic provides the control signals to the active elements on the first and second sides of the H-bridge such that only one pair of diagonally-opposed active elements is conducting at any time.

Furthermore, embodiments of the present invention include supply control logic which provides a signal to the voltage-controlled power supply so as to control the output of said voltage-controlled supply, said output being sufficient to maintain the voltage drop across at least one of the active elements comprising said pair of diagonally-opposed elements within a range of voltage drops for which linear operation of said active element is normally obtained, and said output being greater or equal to a threshold voltage above which the voltage-controlled power supply output is sufficient to maintain the operation of said power supply in a stable manner. For purposes of instruction, a load voltage will be defined as the magnitude of the voltage drop across the load connected between said first and second nodes. For a required load voltage greater than said threshold voltage, the supply control logic, in various embodiments, maintains the output of said supply at a level above the load voltage by a headroom value sufficient to maintain a voltage drop across said active element near a lower voltage of the aforesaid range. For a required load voltage less than said threshold voltage, said supply control logic clamps the output of the voltage-controlled supply to a clamp value sufficient to maintain stable operation of the voltage-controlled supply. In this manner, the output of the voltage-controlled power supply is kept at a level that conserves power, while insuring stable, linear operation of the circuit at all values of load voltage.

Embodiments of the present invention comprise a cooling system including a thermoelectric cooler and a bipolar current source as described above. Such systems include thermal sensors coupled to a thermal load of the thermoelectric cooler and provide feedback for control of the bipolar current source based upon the sensed temperature, to maintain the temperature of the thermal load near a predetermined value.

Various embodiments of the present invention implement the control logic using analog circuitry, digital circuitry, software control processors, and combinations of analog, digital and software controlled resources.

The present invention provides therefore a low-cost bipolar current source, with average power consumption substantially less than has been achieved in prior art systems.

Other aspects and advantages of the present invention can be seen on review of the drawings, the detailed description and the claims, which follow.

BRIEF DESCRIPTION OF THE DRAWINGS

FIG. 1b is a graph showing a transfer function for $V_{supply\ control}$ versus load current for the circuit of FIG. 1a.

FIG. 3b is a graph showing $V_{supply}$ versus $V_{load}$ for the circuit of FIG. 3a.

FIG. 5 is a circuit diagram for the transfer function logic 100 of the circuit shown in FIG. 3a.

FIG. 7a is a more detailed diagram of active conductive element 17, in the circuit of FIG. 7.

FIG. 7b is a more detailed diagram of active conductive element 15 in the circuit of FIG. 7.

DETAILED DESCRIPTION

Figure 1A:
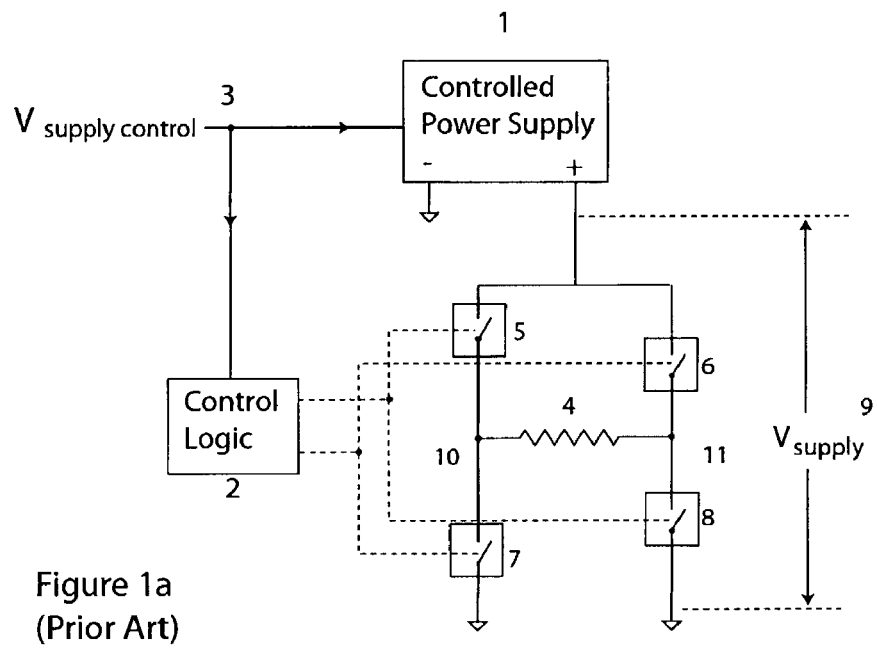
FIG. 1a is a diagram of a prior art digital H-bridge configured as a bipolar current source.

A detailed description of embodiments of the present invention is provided with reference to FIGS. 3a–3b through 7a–7b. As described in FIG. 3a, a controlled voltage power supply 1, with a minimum output voltage $V_{minimum}$, is used in conjunction with a linear H-bridge circuit and additional Transfer Function circuitry 100 to meet the aforementioned objectives. The operation of the complete system may be understood by studying FIG. 3b and by considering two modes of operation; the first of said modes being the condition wherein the desired applied load voltage 25 is less than the minimum stable voltage $V_{minimum}$ of the controlled power supply and the second of said modes being the condition wherein the desired applied load voltage 25 is greater than said minimum stable voltage $V_{minimum}$.

In the former case, the output voltage of 1 is held at $V_{minimum}$ and the current flow through the load is controlled by the linear element pairs 15/17 or 13/19 depending on the polarity of $V_{control}$ 22. For example, consider first the condition of the linear pair 13/19 disabled and element 15 fully conducting, and element 17 controlling the current through the load 4. In the preferred embodiment, elements 17 and 19 are voltage-controlled current sinks in which, for example, the current flow from terminal 10 to ground is linearly dependent on a voltage at terminal 18. Starting at a condition of zero current flow, $V_{supply}$ is held constant at $V_{minimum}$. If element 15 is fully conducting, there is no voltage drop across it, for the purpose of this description, and also since $V_{supply} = V_{load} + V_{current\ sink}$, as the required load voltage $V_{load}$ 25 increases, the voltage $V_{current\ sink}$ across the current sink decreases. At some point, $V_{current\ sink}$ 43 will reach a minimum value Δ. Said minimum value Δ is at or near a lower limit of a range of voltage drops below which said current sink 17 no longer behaves linearly in response to a control voltage $V_{control}$ and is determined by the inherent nature of the device used for element 17. When the required load voltage $V_{load}$ increases further, the circuit block Transfer Function 100 will sense the resulting drop in ($V_{supply} - V_{load}$) below a headroom value, based on Δ for current sink 17 and other active current sinks in the current path through the H-bridge, and said circuitry 100 will work to command an increase in the value of $V_{supply}$ to keep ($V_{supply} - V_{load}$) equal to about the headroom value. Preferably, the headroom value is maintained near a lower limit of the range of linear operation, or at least in a lower part of the range that supports linear operation, in order to conserve power.

Figure 3A:
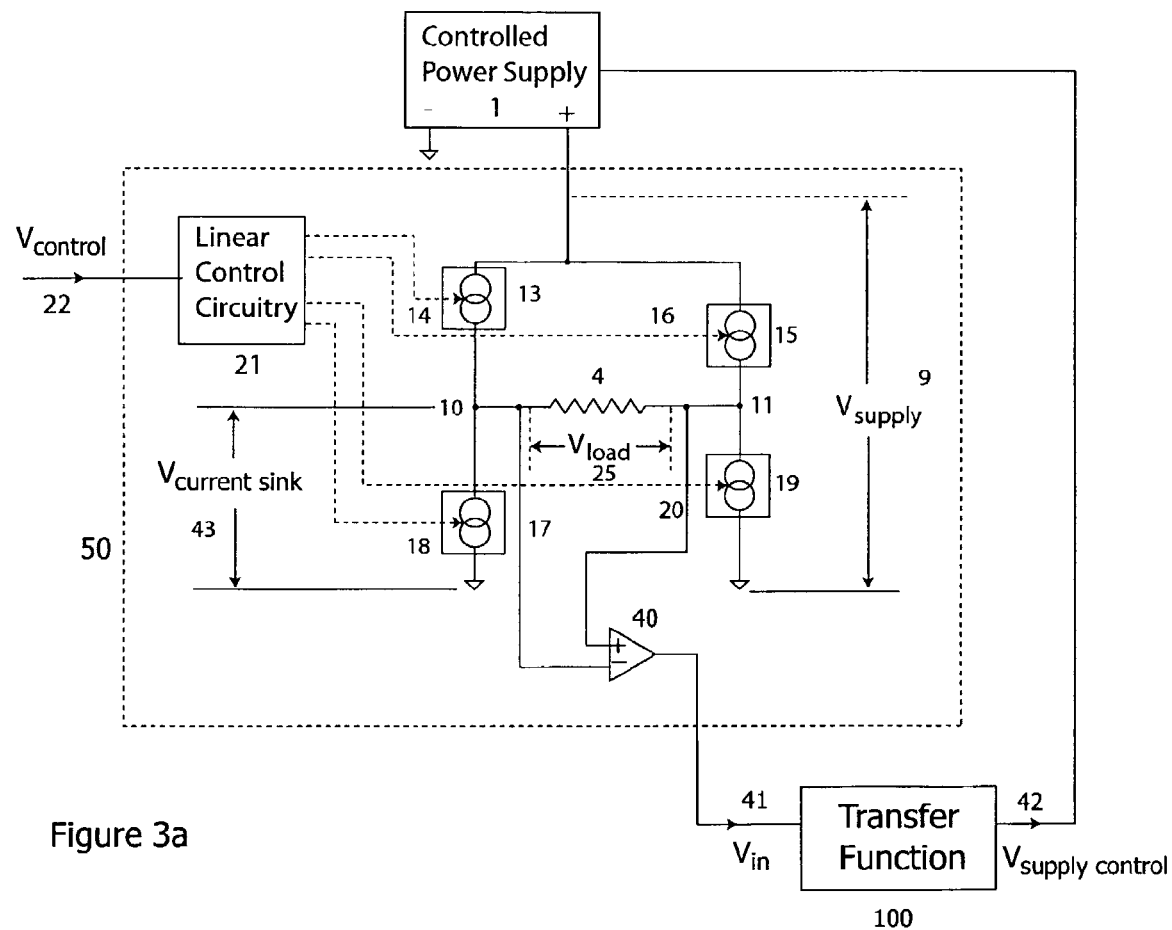
FIG. 3a is a diagram of a dynamic H-bridge configured as a bipolar current source according to the present invention.
Figure 3B:
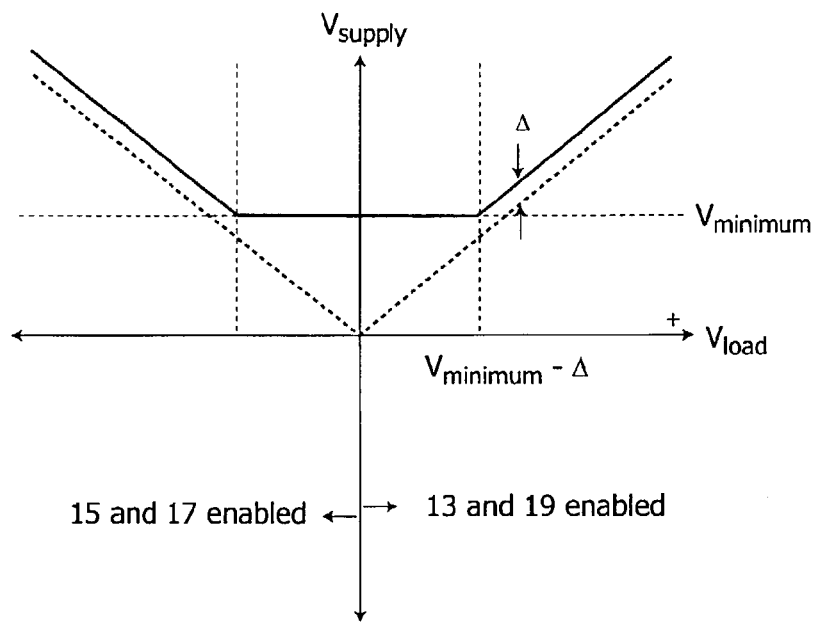

The operation of the Transfer Function 100 may be graphically described as in FIG. 3b, in which the headroom value is heuristically represented by minimum value Δ. Its action is to measure the voltage $V_{in}$ 41 and derive a voltage $V_{supply\ control}$ 42 that, in turn, affects the output of the controlled voltage power supply 1. For the purposes of description, we will assume that the output voltage $V_{supply}$ 9 of the controlled voltage power supply 1 is equal to the value of the voltage $V_{supply\ control}$ and that $V_{load}=V_{in}$. Referring to FIG. 3b, the two operating regions may be observed. If the magnitude of $V_{load}$ is less than or equal to $V_{minimum}-\Delta$, the output voltage $V_{supply\ control}$ of the Transfer Function 100 is fixed to hold $V_{supply}=V_{minimum}$. As the magnitude of the voltage $V_{load}$ rises above $V_{minimum}-\Delta$, $V_{supply\ control}$ is increased to keep $V_{supply}-|V_{load}|$ near constant and equal to about $\Delta$.

Figure 1B:
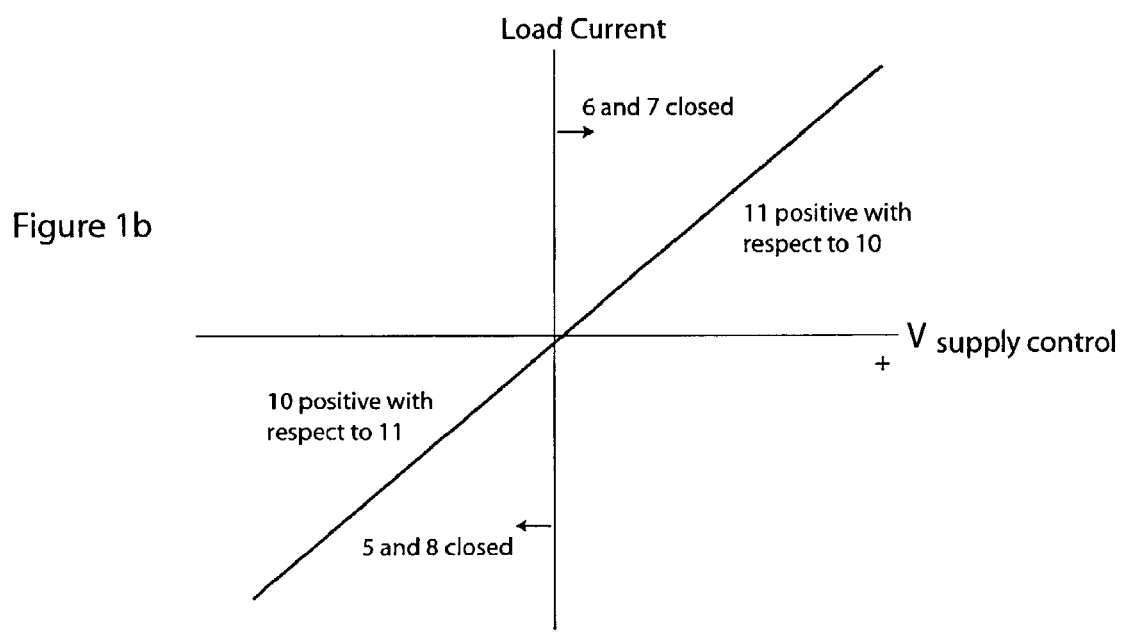

It is important to note that, in evolving from the prior art described in FIG. 1 to the present art described in FIG. 3a, that switches 5 and 6 may also be replaced with voltage-controlled current sinks. It is only necessary to have at least one linear controlled conductive element per each side of the H-bridge if it is to be operable in the manner described in the above teaching.

Figure 2:
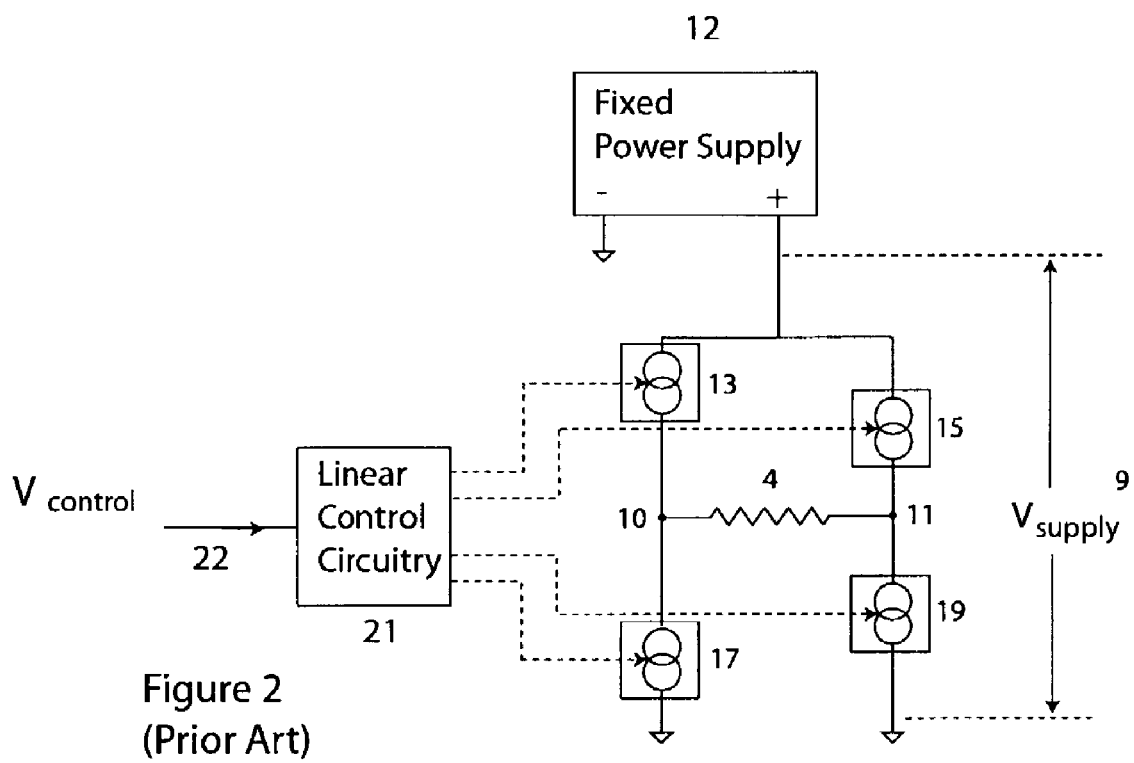
FIG. 2 is a diagram of a prior art linear H-bridge configured as a bipolar current source.

Since one objective of the present invention is to reduce the power dissipation of the elements 17 or 19, it is of benefit to graphically display the power dissipated by the linear element for the circuits described in FIG. 2 and FIG. 3a. As discussed above, there are two regions of interest, region I for which the supply voltage is clamped at a threshold voltage at or near $V_{minimum}$ and region II, for which $V_{supply}-|V_{load}|$ is constant and equal to $\Delta$. For the purposes of discussion, we assume that the linear elements 13 or 15 may be fully conductive and thereby experience no voltage drop. The power dissipated by the element 17 or 19 for region I is:

$$P_I = \frac{(V_{minimum}V_{load})-(V_{load})^2}{R},$$

reaching a maximum of $(V_{minimum})^2/(4R)$. In region II, the power dissipated is given $$P_{II} = \frac{\Delta V_{load}}{R}$$

Figure 4:
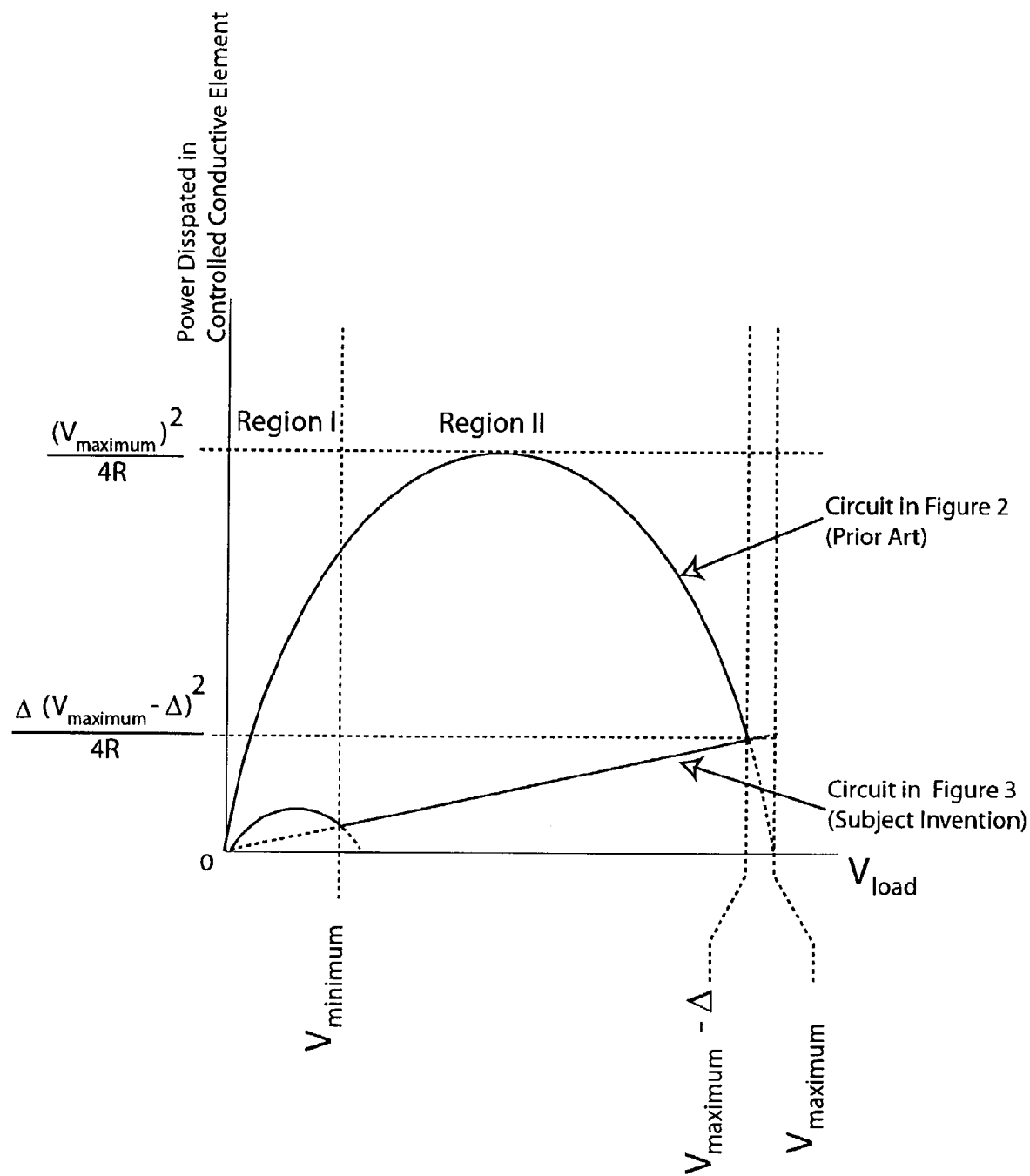
FIG. 4 is a graph showing power dissipation for the circuit of the present invention and for the prior art circuit of FIG. 2.

Both regions are plotted on the graph in FIG. 4. Additionally, for the circuit design described in FIG. 2 with a power supply operating at a fixed voltage of $V_{maximum}$, the power dissipated by the linear element is $$P = \frac{(V_{maximum}V_{load})-(V_{load})^2}{R}$$

and is also plotted on FIG. 4. As an example, we consider a load 4 consisting of a thermoelectric cooler with a resistance of 4 ohms, and a Vicor model V375A48C600A power supply for 1 that may be operated at a fixed voltage output $V_{maximum}$ of 48 volts, or as a variable voltage supply with a minimum supply voltage $V_{minimum}$ of 4 volts and a $V_{maximum}$ of 48 volts. The maximum power dissipated by the element 17 is then 144 Watts for the circuit design of the prior art (FIG. 2), while the circuit design of the present invention (FIG. 3a) reduces the maximum power dissipation to 12 Watts with a minimum voltage drop $\Delta$ of 1 volt across the element 17, demonstrating the advantage offered by the present invention over the prior art.

Figure 5:
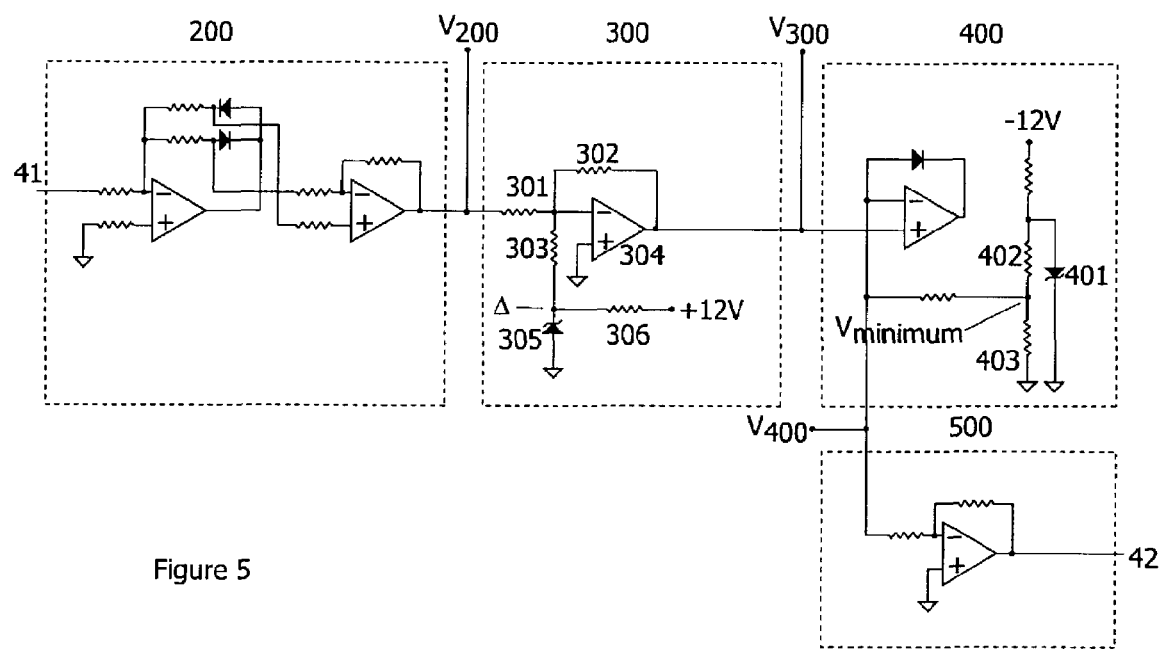

Mathematically, we may express the action of the Transfer Function 100 as graphically described in FIG. 3b as $V_{supply\ control}=|V_{in}|+\Delta$ or no less than $V_{minimum}$. While there are several possible embodiments for enabling the Transfer Function 100 described above, one such embodiment is described in FIG. 5. The circuitry may be considered in several sections, labeled 200, 300, 400 and 500. The function of the first section 200 is well-known in the art as an Absolute Value circuit, transforming the input load voltage $V_{in}$ 41 which may take on positive or negative values, depending on the polarity of the current flow through the load 4, into the absolute value $V_{200}=|V_{in}|$. Section 300 performs a Voltage Inversion of the output of section 200, and further offsets this voltage by an amount corresponding to the minimum voltage drop $\Delta$ across the current sink, thus providing an output $V_{300}=-|V_{in}|-\Delta$ by applying an offset voltage $\Delta$ created by voltage reference 305 to the input of the unity gain summing amplifier formed by 301, 302, 303 and 304. Section 400, known in the art as a Clamp circuit, limits the output of the prior section 300 to a value no less negative than $-V_{minimum}$, said voltage $-V_{minimum}$ being generated by the action of voltage reference 401 and voltage divider 403 and 402, so that the voltage at the output of section 400 equals $V_{400}=-|V_{in}|-\Delta$ or $-V_{minimum}$, whichever is more negative. Finally, section 500 performs one further Voltage Inversion, resulting in the final transfer function relating $V_{in}$ and $V_{supply\ control}$ to be $$V_{supply\ control}=|V_{in}|+\Delta \text{ or } V_{minimum},$$

whichever is greater.

While the above described circuitry performs the requisite transfer function using analog techniques, the same function may be readily performed using digital software techniques, by using hardwired digital circuitry, a software-controlled processor or a combination of the same.

Figure 6:
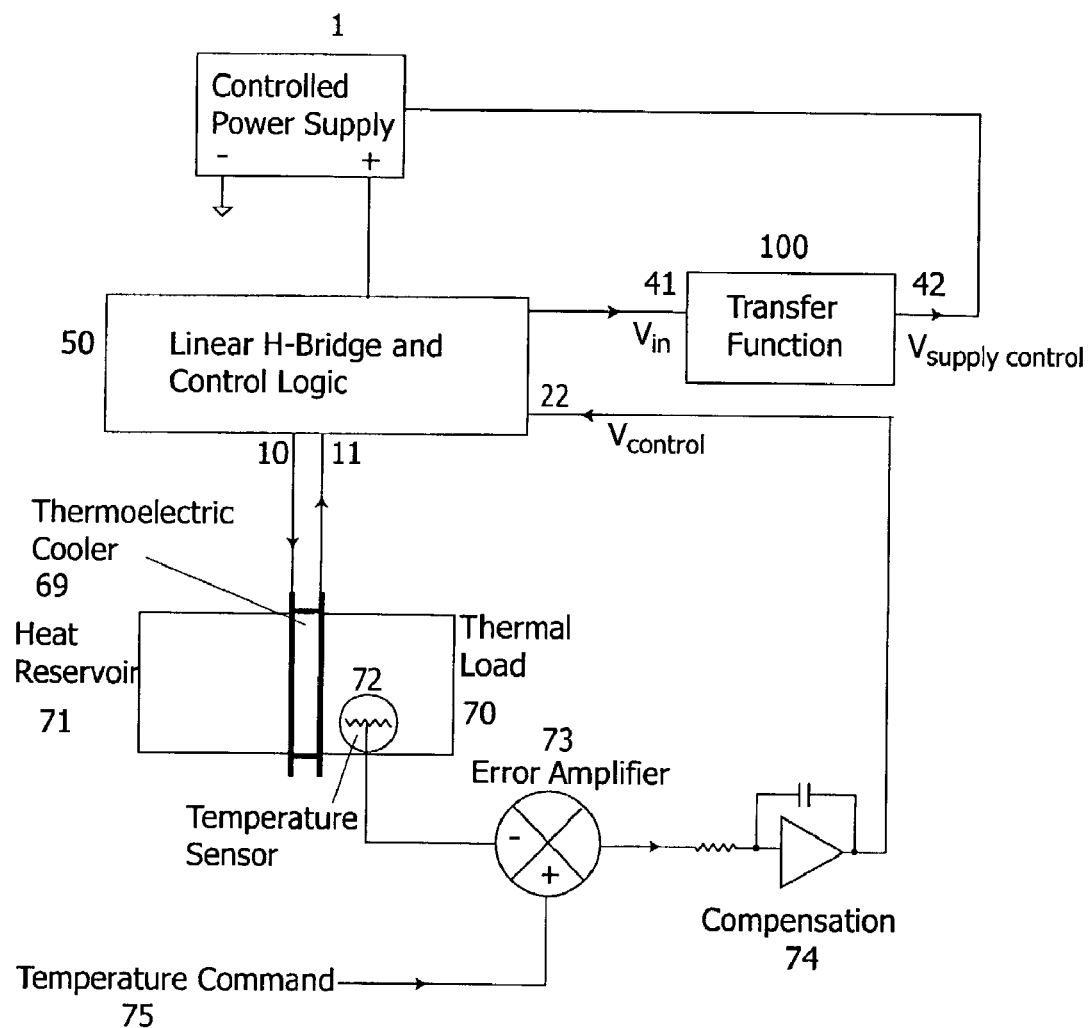
FIG. 6 illustrates cooling system including a thermoelectric cooler with a current source according to the present invention.

While the above described techniques may be used for supplying bipolar current to any load from a unipolar power supply source, one specific application may be the supplying of power to thermoelectric coolers for the purposes of controlling the temperature of a thermal load. FIG. 6 describes the way in which the present invention may be used in a temperature control system, in which the load 4 has been replaced by a thermoelectric cooler 69 and elements 21, 13, 17, 18, 19 and 40 are collected into element 50. Said cooler is used to transfer heat from a thermal load 70 to a heat reservoir 71, the temperature of said thermal load being detected by a sensor 72, and the signal representing such temperature being further routed to additional control circuitry 73 and 74 and compared to a signal 75 representing a preselected temperature. Said additional control circuitry then provides a further command voltage $V_{control}$ to the input of the circuitry described in the present invention, thereby supplying the current needed by the thermoelectric cooler 69 to hold the temperature of the thermal load 70 at the desired value.

Figure 7:
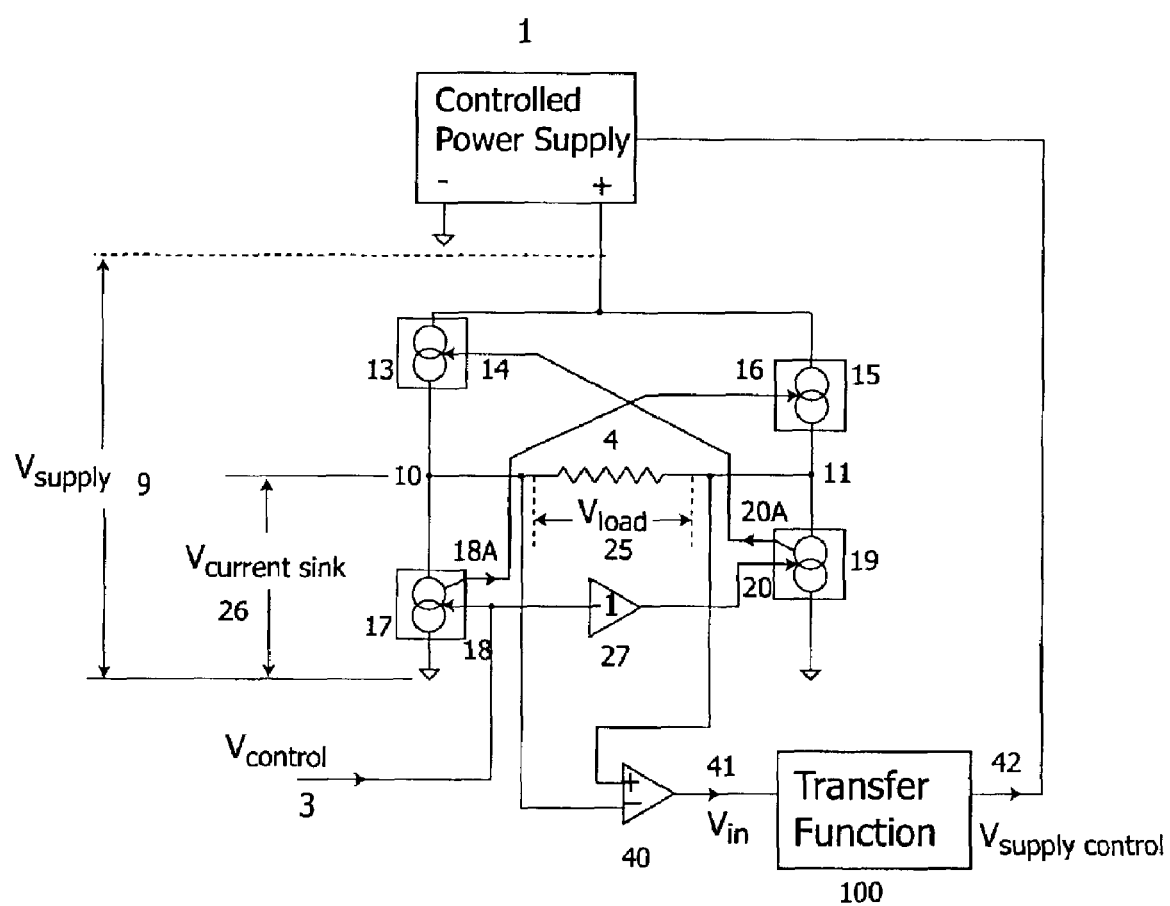
FIG. 7 is a circuit diagram of one embodiment of an H-bridge configured according to the present invention.

Additionally, a more detailed schematic of one possible embodiment of the elements within the linear H-bridge is provided in FIG. 7. In this embodiment, portions of the logic functions incorporated into the Linear Control Circuitry 21 of FIG. 3 are distributed among linear elements 17 and 19 and inverting amplifier 27. Signals formerly derived from Linear Control Circuitry 21 and directed to a control input 14 of linear element 13 and a control input 16 of linear element 15 are instead derived from control outputs 18a and 20a of linear elements 17 and 19 respectively. FIG. 7a displays one of two identical linear elements 17 and 19 comprising a current sink based on a high-current MOSFET transistor 601 and an operational amplifier 602. Current sensing is achieved by measuring the voltage drop across resistor 603. The resulting voltage is converted into a current when applied across resistor 604 and compared to the current passing through resistor 605 generated by an applied voltage at 18. The operational amplifier drives the gate of the MOSFET 601 to cause the currents in 604 and 605 to be equal, thereby creating a voltage-controlled current source. Additionally, the current source has an output 18A which communicates the value of the MOSFET 601 gate voltage to the diagonally opposed elements of the H-bridge. A further inverting amplifier 27 well-known in the art is included as part of the control circuitry of FIG. 7 to insure that only one of the identical elements 17 or 19 is enabled at any time.

FIG. 7b describes one of two identical controlled elements 13 and 15. The objective in this embodiment is to apply the same magnitude of voltage between the gate and source terminals of the MOSFET 709 as is applied across the gate and source of the MOSFET 601 so that said MOSFETs become conductive simultaneously. However, since MOSFET 709 is a P-channel device while MOSFET 601 is an N-channel device, and since the source terminal of MOSFET 709 is elevated to the output voltage of the controlled power supply 1 which may vary widely during operation, a level-shifting circuit must be used to reference the voltage to be applied to the gate of MOSFET 709 to said output voltage and also to invert the polarity of said applied voltage as compared to that applied to the MOSFET 601. Said level-shifting/inverting circuitry consists of resistors 701, 702, 703, 704, 706 and 707, along with amplifier 705 and transistor 708. Said resistors may be chosen to provide voltage gain so that the magnitude of the voltage applied to the gate of MOSFET 701 is some multiple of that applied to the gate of MOSFET 601. In addition, MOSFET 709 may be chosen to have a transfer characteristic such that it conducts more fully for a given applied gate voltage than does MOSFET 601. In this way, MOSFET 709 acts more as a simple switch, exhibiting little or no voltage drop across its drain and source terminals, while MOSFET 601 then acts as the current-controlling element for the diagonally-opposed linear element pair 15/17.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

The invention claimed is:

1. An apparatus for applying an adjustable bipolar current to a load comprising:
    a voltage-controlled power supply having a unipolar output;
    an H-bridge with four active elements having a first side with two active conductive elements, connected at a first node in series on each side between said unipolar output of the power supply and ground, and having a second side with two active conductive elements, connected at a second node, in series on each side between said unipolar output of the power supply and ground, wherein said first node and said second node are adapted to be coupled to said load so that current flows between said first and second nodes through the load, the current having a polarity determined by a direction of said flow;
    at least one of the two active conductive elements on each of the first and second sides of the H-bridge comprising active conductive elements responsive to control signals which set a magnitude of current flow through the conductive elements;
    control logic that provides the control signals to said active conductive elements on the first arid second sides to enable one conductive element on each of said first and second sides to set the polarity of the current from said unipolar output of the power supply through said load, and to control the magnitude of the current flow through said load; and
    logic, coupled to said voltage-controlled power supply and to said H-bridge and coordinated with the control logic, to supply a control voltage to said voltage-controlled power supply such that that voltage drop across at least one of said active conductive elements remains near a lower limit of said range unless this condition results in said voltage-controlled power supply operating below some threshold voltage, in which case the output of said voltage-controlled power supply is fixed to said threshold voltage.

2. The apparatus of claim 1, comprising a thermoelectric cooler, which acts as said load, and further including a sensor to determine a temperature of a thermal loud affixed to said thermoelectric cooler, and wherein the control logic includes circuitry coupled to the sensor by which the temperature of said thermal load is maintained near predetermined value.

3. The apparatus of claim 1 comprising a thermoelectric cooler coupled to the first and second nodes, which comprises at least a portion of said load.

4. The apparatus of claim 1 in which said logic coupled to said voltage-controlled power supply to supply a control voltage comprises analog circuitry.

5. The apparatus of claim 1 in which said logic coupled to said voltage-controlled power supply to supply a control voltage comprises analog circuitry including an absolute value circuit, followed by a voltage inversion and offset addition circuit, followed by a clamping circuit, and followed by a final voltage inversion circuit.

6. The apparatus of claim 1 in which said voltage-controlled power supply is a commercially-available switching-mode power supply with a controlling terminal by which the output voltage of said power supply may be adjusted over a range between sonic minimum and maximum voltage.

7. The apparatus of claim 1 in which in which said logic coupled to said voltage-controlled power supply to supply a control voltage comprises digital circuitry.

8. The apparatus of claim 1 in which in which said logic coupled to said voltage-controlled power supply to supply a control voltage comprises a software controlled processor.

9. The apparatus of claim 1 wherein at least one of the conductive elements comprises a voltage-controlled current sink, including an N-channel MOSFET transistor connected in series with a current-sensing resistor, across said current-sensing resistor there being a voltage drop representative of current flow through said current sink, said voltage drop then subsequently being applied across a summing resistor, causing a sense current to flow through said summing resistor, said sense current being representative of the current through said current sink and being subsequently added to a current representative of a command current by an operational amplifier which is used to control said MOSFET transistor.

10. The apparatus of claim 9 wherein at least one of the conductive elements comprises a circuit including a level shifter and polarity inverter, whose output is then connected to a P-channel MOSFET transistor wherein the voltage applied across gate and source terminals of said P-channel MOSFET is proportional to the voltage applied across gate and source terminals of the N-channel MOSFET.

* * * * *